United States Patent
Szente et al.

(10) Patent No.: US 10,717,407 B2
(45) Date of Patent: Jul. 21, 2020

(54) DUAL CATCH MECHANISM FOR ACTIVE PEDESTRIAN SAFETY LATCH

(71) Applicant: MAGNA CLOSURES INC., Newmarket (CA)

(72) Inventors: Csaba Szente, Newmarket (CA); John Distefano, Richmond Hill (CA); Ioan Dorin Ilea, Vaughan (CA)

(*) Notice: Subject to any disclaimer, the term of this patent is extended or adjusted under 35 U.S.C. 154(b) by 78 days.

(21) Appl. No.: 16/197,623

(22) Filed: Nov. 21, 2018

(65) Prior Publication Data
US 2019/0152425 A1  May 23, 2019

Related U.S. Application Data

(60) Provisional application No. 62/589,229, filed on Nov. 21, 2017.

(51) Int. Cl.
*B60R 21/38* (2011.01)
*E05B 77/08* (2014.01)
(Continued)

(52) U.S. Cl.
CPC ............ *B60R 21/38* (2013.01); *E05B 51/023* (2013.01); *E05B 77/08* (2013.01); *E05B 81/16* (2013.01);
(Continued)

(58) Field of Classification Search
CPC ....... B60R 21/38; E05B 51/023; E05B 81/16; E05B 83/24; E05B 77/08; E05B 85/00; E05Y 2900/536
See application file for complete search history.

(56) References Cited

U.S. PATENT DOCUMENTS 5,273,325 A * 12/1993 Zimmermann ......... E05B 81/22
                                                    292/216
6,364,402 B1   4/2002 Sasaki
(Continued)

FOREIGN PATENT DOCUMENTS

CN         105421909 A    3/2016
DE         10108880 A1    9/2002
(Continued)

*Primary Examiner* — Drew J Brown

(57) ABSTRACT

A latch assembly for a closure panel of a vehicle, the latch assembly comprising: a mounting plate; a ratchet and pawl pivotally mounted to the mounting plate, the ratchet for retaining a mating latch component in a primary latched position in a slot of the mounting plate, the ratchet released from the primary latched position by movement of the pawl; a secondary catch coupled to the mounting plate for retaining the mating latch component in a secondary latched position after the mating latch component being released from the ratchet; an active secondary catch coupled to the mounting plate by a pivot connection, the active secondary catch for retaining the mating latch component in a travel position after said mating latch component being released from the ratchet, the travel position being further from the slot than the secondary latched position, the active secondary catch having a slot providing for translation of the pivot connection therein; a lift lever mounted to the mounting plate, the lift lever for moving the mating latch component past the secondary latched position to the travel position as the pivot connection travels along the slot; wherein actuation of the lift lever by an actuation system causes movement of the secondary catch away from the slot in order to inhibit retention of the mating latch component thereby and to deploy the active secondary catch towards the slot in a deployed position in order to facilitate retention of the mating latch component thereby.

20 Claims, 14 Drawing Sheets

(51) Int. Cl.
   *E05B 83/24* (2014.01)
   *E05B 81/16* (2014.01)
   *E05B 51/02* (2006.01)

(52) U.S. Cl.
   CPC ........ *E05B 83/24* (2013.01); *E05Y 2900/536* (2013.01)

(56) References Cited

U.S. PATENT DOCUMENTS

| | | | |
|---|---|---|---|
| 8,235,428 B2* | 8/2012 | Hunt | E05B 85/26 |
| | | | 292/216 |
| 8,573,658 B2 | 11/2013 | Kim | |
| 9,120,461 B2 | 9/2015 | Farooq et al. | |
| 9,145,716 B2 | 9/2015 | Jayasuriya et al. | |
| 9,187,936 B2* | 11/2015 | Kim | E05B 83/24 |
| 9,255,429 B2* | 2/2016 | Kim | E05B 83/24 |
| 9,382,731 B2 | 7/2016 | Kim et al. | |
| 9,476,233 B2 | 10/2016 | Uyanik et al. | |
| 9,512,650 B2 | 12/2016 | Faruque et al. | |
| 9,637,082 B2 | 5/2017 | Ferri et al. | |
| 9,863,170 B2 | 1/2018 | Park et al. | |
| 2016/0177600 A1 | 6/2016 | Kugler et al. | |
| 2016/0340941 A1* | 11/2016 | Taurasi | E05B 83/24 |
| 2017/0036642 A1 | 2/2017 | Nomura | |
| 2018/0030763 A1* | 2/2018 | Distefano | E05B 77/54 |
| 2019/0152426 A1* | 5/2019 | Szente | E05B 81/16 |
| 2019/0218833 A1* | 7/2019 | Nelsen | E05B 85/243 |
| 2019/0232915 A1* | 8/2019 | Szente | B60R 21/38 |
| 2019/0338567 A1* | 11/2019 | Szente | E05B 77/08 |

FOREIGN PATENT DOCUMENTS

| | | |
|---|---|---|
| DE | 10204422 A1 | 8/2003 |
| DE | 102004023729 A1 | 12/2005 |
| DE | 102007012175 A1 | 2/2008 |
| DE | 102007021840 A1 | 11/2008 |
| DE | 102013203801 A1 | 4/2014 |
| DE | 102013202207 A1 | 8/2014 |
| DE | 102013003956 A1 | 9/2014 |
| DE | 102013114414 A1 | 3/2015 |
| DE | 102013114106 A1 | 4/2015 |
| DE | 102014110146 A1 | 6/2015 |
| DE | 102015100627 A1 | 8/2015 |
| EP | 1172507 A2 | 1/2002 |
| EP | 2317038 A2 | 5/2011 |
| EP | 2341204 A2 | 7/2011 |
| EP | 2481645 A1 | 8/2012 |
| EP | 2615012 A1 | 7/2013 |
| EP | 2907731 A1 | 8/2015 |
| EP | 3036390 A1 | 6/2016 |
| EP | 3071768 A1 | 6/2016 |
| GB | 2480798 A | 12/2011 |
| JP | 2002206363 A | 7/2002 |
| JP | 04348157 B2 | 9/2005 |
| JP | 2012153208 A | 8/2012 |
| JP | 201323148 A | 2/2013 |
| KR | 1459937 B1 | 11/2014 |
| WO | 2014/186872 A1 | 11/2014 |

* cited by examiner

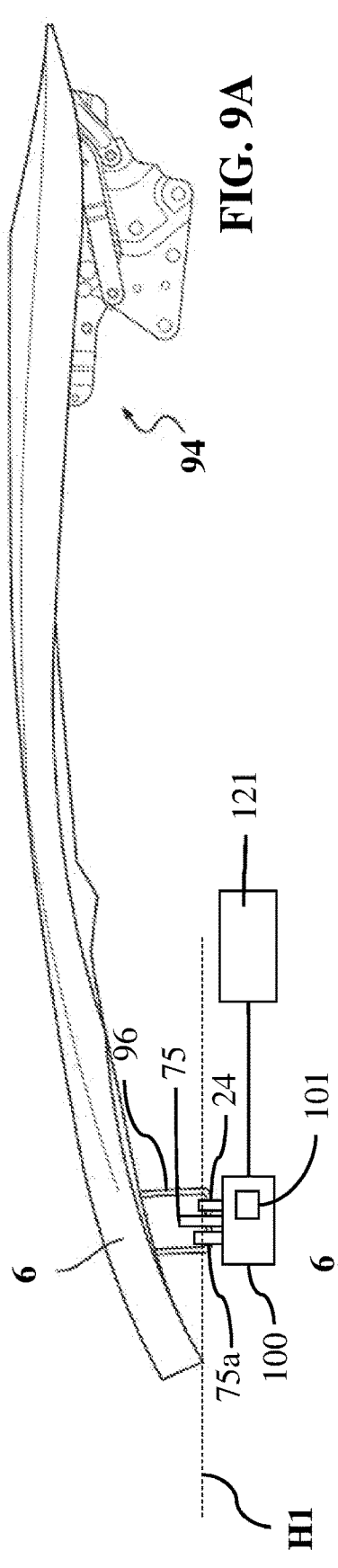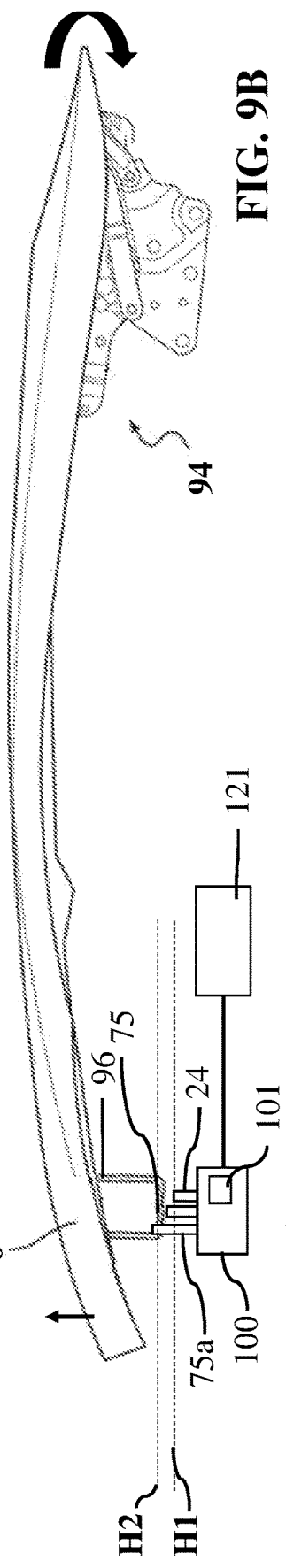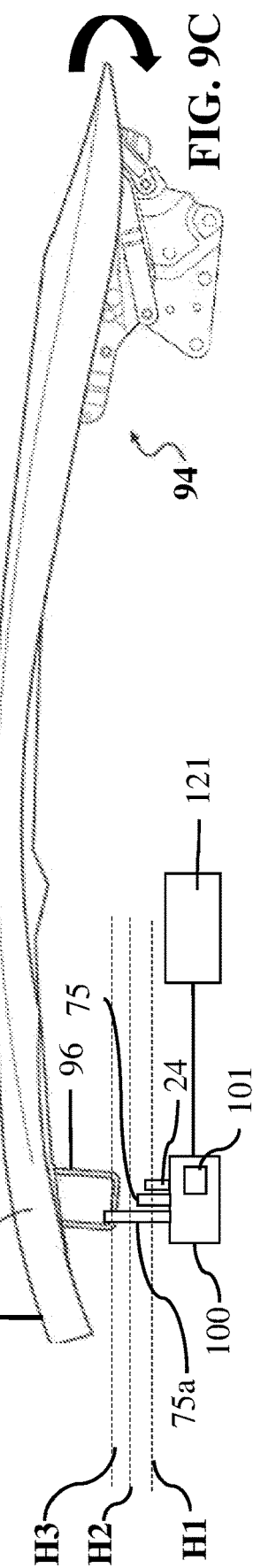

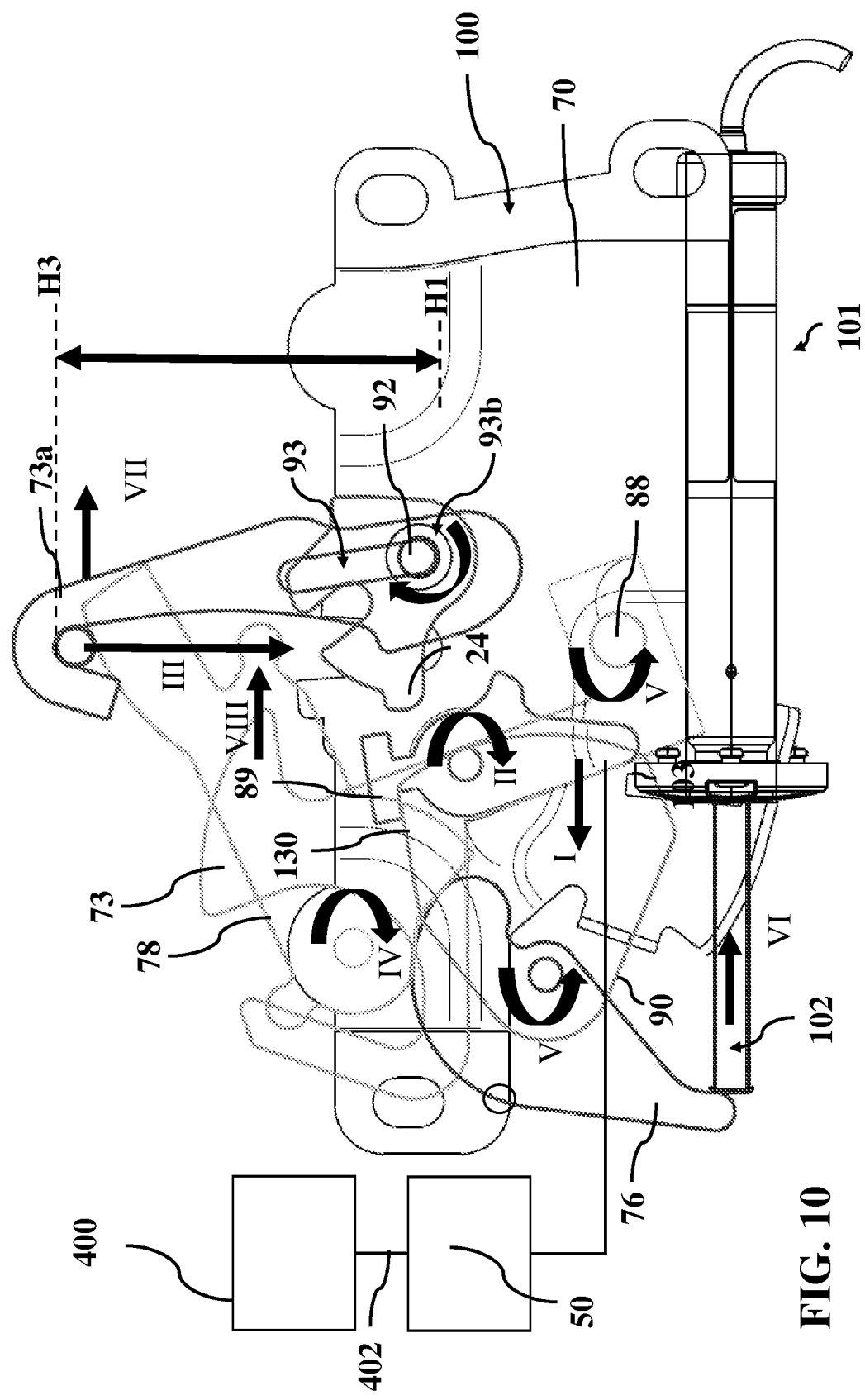

DUAL CATCH MECHANISM FOR ACTIVE PEDESTRIAN SAFETY LATCH

CROSS-REFERENCE TO RELATED APPLICATIONS

This application claims priority from U.S. Provisional Patent Application No. 62/589,229, filed on Nov. 21, 2017; the entire contents of which are hereby incorporated by reference herein.

FIELD

This disclosure relates to vehicle safety systems.

BACKGROUND

The automotive industry is attempting to better protect pedestrians from head on collisions with vehicles. When a car hits a pedestrian in a front end collision, the pedestrian can be thrown up and land on the front hood of the vehicle and/or the windshield. In an effort to ameliorate the harshness of the impact, and in particular to prevent the person's head from hitting the engine block or other hard point located directly underneath the front hood, it is desired to actively space the front hood from the engine block whenever a front end collision is detected. In particular, when a front end collision is detected by crash sensors, it is desired to move the front hood in a very short period of time (e.g., in milliseconds) from a first aerodynamic position where the front hood is normally located very close to the engine block to a second position where the front hood is actively moved further away from the engine block. This activity could provide the pedestrian's head and/or torso with sufficient time and/or space to decelerate when the pedestrian impacts the front hood and thus prevent fatal injury.

Other problems in industry related to safety systems is actuation speed and/or actuation distance of safety devices (e.g. device response time) tempered with actuation power requirements, including the ability for the vehicle systems to return to normal operation after deployment of the safety systems. A further problem in industry is the need for reduced cost of safety systems, including modular components to facilitate replacement a reduction in replacement costs.

SUMMARY

It is an object to the present invention to provide a component of a safety system to obviate or mitigate at least one of the above-mentioned problems.

A first aspect provided is a latch assembly for a closure panel of a vehicle, the latch assembly comprising: a mounting plate; a ratchet and pawl pivotally mounted to the mounting plate, the ratchet for retaining a mating latch component in a primary latched position in a slot of the mounting plate, the ratchet released from the primary latched position by movement of the pawl; a secondary catch coupled to the mounting plate for retaining the mating latch component in a secondary latched position after the mating latch component being released from the ratchet; an active secondary catch coupled to the mounting plate by a pivot connection, the active secondary catch for retaining the mating latch component in a travel position after said mating latch component being released from the ratchet, the travel position being further from the slot than the secondary latched position, the active secondary catch having a slot providing for translation of the pivot connection therein; a lift lever mounted to the mounting plate, the lift lever for moving the mating latch component past the secondary latched position to the travel position as the pivot connection travels along the slot; wherein actuation of the lift lever by an actuation system causes movement of the secondary catch away from the slot in order to inhibit retention of the mating latch component thereby and to deploy the active secondary catch towards the slot in a deployed position in order to facilitate retention of the mating latch component thereby.

A second aspect provided is a method for operating a latch assembly having a ratchet for retaining a mating latch component in a primary latched position in a slot of the latch assembly, the latch assembly further having an actuation system for casing movement of a lift lever, the method comprising the steps of: actuating the actuation system in order to release the ratchet and thus move the mating latch component out of the primary latched position; moving the lift lever in order to move a secondary catch of the latch assembly away from the slot and to move an active secondary catch of the latch assembly towards the slot to a deployed position; retaining the mating latch component by the active secondary catch as the active secondary catch moves from the deployed position to a travel position under influence of further movement of the lift lever, the travel position being further from the slot than the deployed position; wherein said moving of the lift lever causes movement of the secondary catch away from the slot in order to inhibit retention of the mating latch component thereby and to deploy the active secondary catch towards the slot in the deployed position in order to facilitate retention of the mating latch component thereby.

BRIEF DESCRIPTION OF THE DRAWINGS

The foregoing and other aspects will be more readily appreciated having reference to the drawings, wherein:

FIGS. 9A to 9C are sequential views of a mating latch component being moved by the latch of FIG. 4 from an initial position, to a first active pop-up height, to a second active pop-up height, in accordance with an illustrative embodiment; and FIG. 10 illustrates an operational reset of the latch FIG. 3, in accordance with an illustrative embodiment.

DESCRIPTION OF THE PREFERRED EMBODIMENTS

Figure 1:
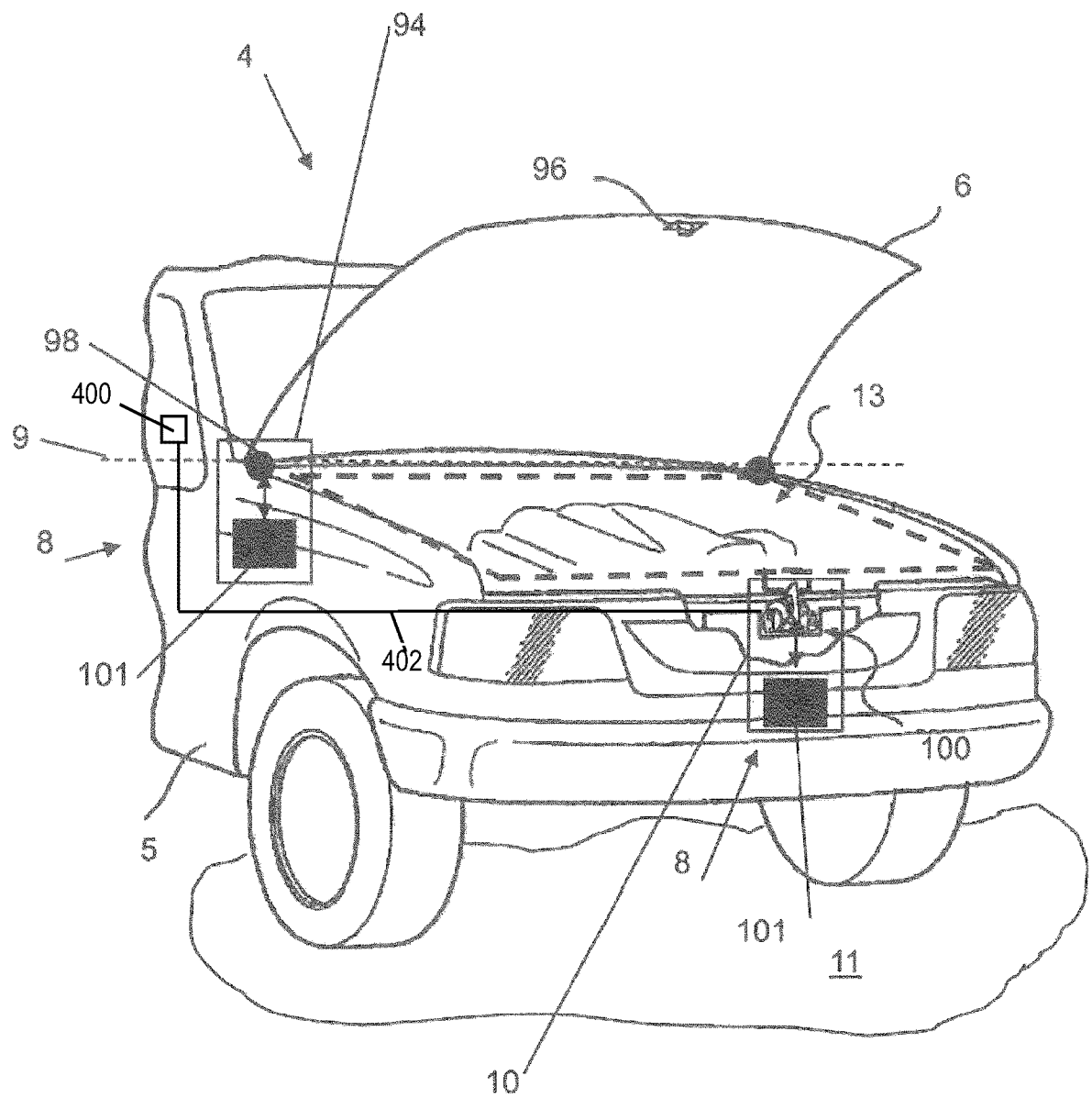
FIG. 1 is a perspective view of an example vehicle using a safety actuation system.

Referring to FIG. 1, shown is a vehicle 4 with a vehicle body 5 having one or more closure panels 6. The closure panel 6 is connected to the vehicle body 5 via one or more panel operation components 8, for example such as but not limited to a hinge 98 and/or a latch 100 (e.g. for retaining the closure panel 6 in a closed position once closed or for retaining the closure panel 6 in an open position once opened). It is also recognized that the hinge 98 can be configured as a biased hinge that can be configured to bias the closure panel 6 towards the open position and/or towards the closed position. Further, the panel operation component 8 can be configured as a lift assist system including one or more struts, not shown, for example used in tail lift gate systems. The closure panel 6 can have a mating latch component 96 (e.g. striker) mounted thereon for coupling with a respective panel operation component 8 (e.g. latch) mounted on the vehicle body 5. Alternatively, the panel operation component 8 can be mounted on the closure panel 6 and the mating latch component 96 mounted on the vehicle body 5 (not shown). In further alternative, the panel operation component 8 can be used to operatively couple the closure panel 6 to the vehicle body 5, such as the case for the hinge 98.

The panel operation components 8 provide for movement of the closure panel 6 between a closed panel position (shown in dashed outline) and an open panel position (shown in solid outline), such that the operation component(s) 8 can be involved during the movement of the closure panel 6 between the open panel position and the closed panel position (e.g. for a hinge 98), can be involved in driving the movement of the closure panel 6 towards the open panel position (e.g. for an opening latch 100), or can be involved in driving the movement of the closure panel 6 towards the closed panel position (e.g. for a retaining latch 100). In the embodiment shown, the closure panel 6 pivots between the open panel position and the closed panel position about a pivot axis 9 (e.g. of the hinge 98), which can be configured as horizontal or otherwise parallel to a support surface 11 of the vehicle 4. In other embodiments, the pivot axis 9 may have some other orientation such as vertical or otherwise extending at an angle outwards from the support surface 11 of the vehicle 4. In still other embodiments, the closure panel 6 may move in a manner other than pivoting, for example, the closure panel 6 may translate along a predefined track or may undergo a combination of translation and rotation between the open and closed panel positions, such that the hinge 98 includes both pivot and translational components (not shown). As can be appreciated, the closure panel 6 can be embodied, for example, as a hood, passenger door or lift gate (otherwise referred to as a hatch) of the vehicle 4. Also provided is an actuation system 101 coupled to one or more of the panel operation components 8, such that the actuation system 101 is configured for actuating the operation or otherwise bypassing the operation of the one or more panel operation components 8, as further described below. In this manner, the actuation system 101 can be used to forcefully provide, during deployment, some form of force assisted open operation (e.g. full open, partial open, etc.) of the closure panel 6.

For vehicles 4, the closure panel 6 can be referred to as a partition or door, typically hinged, but sometimes attached by other mechanisms such as tracks, in front of an opening 13 which is used for entering and exiting the vehicle 4 interior by people and/or cargo. It is also recognized that the closure panel 6 can be used as an access panel for vehicle 4 systems such as engine compartments and also for traditional trunk compartments of automotive type vehicles 4. The closure panel 6 can be opened to provide access to the opening 13, or closed to secure or otherwise restrict access to the opening 13. It is also recognized that there can be one or more intermediate open positions (e.g. unlatched position such as but not limited to a secondary unlatched position) of the closure panel 6 between a fully open panel position (e.g. unlatched position) and fully closed panel position (e.g. latched position), as provided at least in part by the panel operation component(s) 8. For example, the panel operation component(s) 8 can be used to provide an opening force (or torque) and/or a closing force (or torque) for the closure panel 6.

Movement of the closure panel 6 (e.g. between the open and closed panel positions) can be electronically and/or manually operated, where power assisted closure panels 6 can be found on minivans, high-end cars, or sport utility vehicles (SUVs) and the like. As such, it is recognized that movement of the closure panel 6 can be manual or power assisted during operation of the closure panel 6 at, for example: between fully closed (e.g. locked or latched) and fully open (e.g. unlocked or unlatched); between locked/latched and partially open (e.g. unlocked or unlatched); and/or between partially open (e.g. unlocked or unlatched) and fully open (e.g. unlocked or unlatched). It is recognized that the partially open configuration of the closure panel 6 can also include a secondary lock (e.g. closure panel 6 has a primary lock configuration at fully closed as shown in FIG. 4, and a secondary lock configuration at partially open—for example for latches 100 associated with vehicle hoods as involving secondary catches 75—see FIG. 3).

In terms of vehicles 4, the closure panel 6 may be a hood, a lift gate, or it may be some other kind of closure panel 6, such as an upward-swinging vehicle door (i.e. what is sometimes referred to as a gull-wing door) or a conventional type of door that is hinged at a front-facing or back-facing edge of the door, and so allows the door to swing (or slide) away from (or towards) the opening 13 in the vehicle body 5. Also contemplated are sliding door embodiments of the closure panel 6 and canopy door embodiments of the closure panel 6, such that sliding doors can be a type of door that open by sliding horizontally or vertically, whereby the door is either mounted on, or suspended from a track that provides for a larger opening 13 for equipment to be loaded and unloaded through the opening 13 without obstructing access. Canopy doors are a type of door that sits on top of the vehicle 4 and lifts up in some way, to provide access for vehicle passengers via the opening 13 (e.g. car canopy, aircraft canopy, etc.). Canopy doors can be connected (e.g. hinged at a defined pivot axis and/or connected for travel along a track) to the vehicle body 5 of the vehicle at the front, side or back of the door, as the application permits. It is recognized that the vehicle body 5 can be represented as a body panel of the vehicle 4, a frame of the vehicle 4, and/or a combination frame and body panel assembly, as desired.

Referring again to FIG. 1, the closure panel 6 can be configured as a hood panel of the vehicle 4, such that each hinge 98 and respective actuation system 101 is configured as a hinge assembly 94, and the latch 100 and the actuation system 101 is configured as a latch assembly 10.

Figure 2:
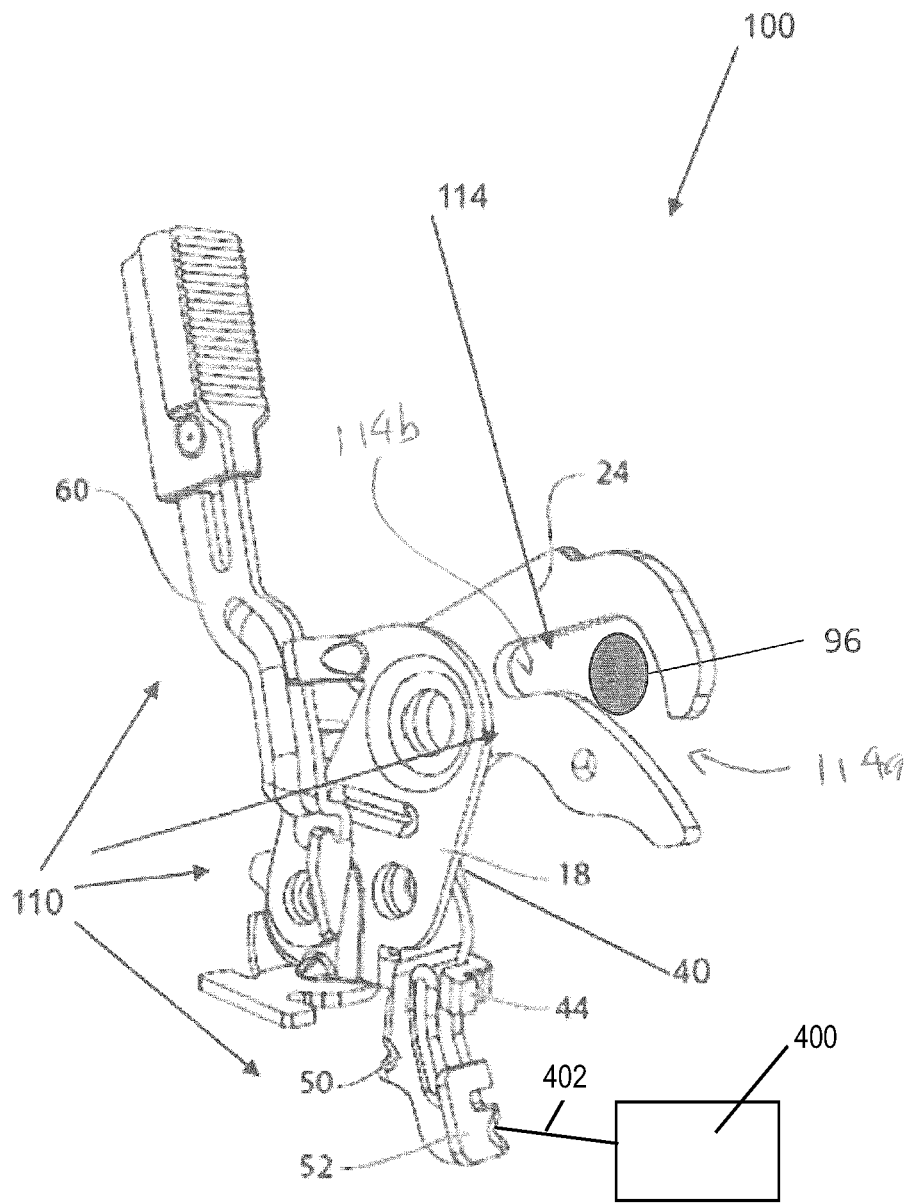
FIG. 2 is a front elevation view of a hood latch of FIG. 1 shown in isolation.

Referring to FIG. 2, one embodiment of the latch 100 includes a mounting plate (70—see FIG. 3) that can be contoured to facilitate attachment of the latch 100 to a frame (e.g. vehicle body 5) of the motor vehicle 4 (see FIG. 1). The mounting plate 70 can be contoured to define a generally planar mounting surface and a plurality of apertures for attaching various components of the latch 100 thereto. Preferably, mounting plate 70 is a stamped metal component. A mating latch component 96 (e.g. striker) is secured to the closure panel 6 (e.g. hood 6) and extends outwardly therefrom. The mating latch component 96 can be a generally U-shaped bar that is engaged by the latch 100 to latch the closure panel 6 in the closed position. The latch 100 is secured to the vehicle body 5 by mounting plate and positioned so that the mating latch component 96 will engage the latch 100 upon the closure panel 6 reaching the closed position. It is appreciated that, alternatively, the latch 100 may be secured to the closure panel 6 and the mating latch component 96 may be secured to the vehicle body 5 of the vehicle 4. Positioned on the mounting plate can be a fishmouth or slot 114 for receiving the mating latch component 96 therein, in other words the slot 114 of the latch 100 is configured for receiving a keeper (e.g. striker) of the mating latch component 96. The slot 114 has an open top end 114a and a closed bottom end 114b. The latch 100 can also include a cover plate 72 (shown in ghosted view). The mounting plate 70 (see FIG. 3) and the cover plate 72 can be interconnected by first and second rivets (not shown) that each have respective integral shafts (not shown) extending beyond the cover plate. The mounting plate 70, cover plate 72 and the interconnecting rivets can provide a housing 74 for the latch 100. Those skilled in the art will appreciate that a wide variety of alternative configurations may be deployed to provide the housing 74.

The latch 100 includes a number of latch elements 110 (e.g. a ratchet 24 and a pawl 40) that are configured to couple to the mating latch component 96 in order to retain the mating latch component 96 within the slot 114 when the closure panel 6 is in the closed position (e.g. locked or otherwise called the primary latched position). Alternatively, the latch elements 110, both of which are pivotally secured to the frame plate. The ratchet 24 can include a pair of arms spaced apart to define the generally u-shaped slot 114 there between (e.g. a hook arm and a lip arm that extends laterally beyond the hook arm). The ratchet 24 can also include a primary shoulder stop and a pointed secondary shoulder stop. Note that in FIG. 2 the ratchet 24 is shown in a fully closed position (e.g facilitating the retention of the mating latch component 96 in the slot 114) which may also be referred to as the primary latched position.

The ratchet 24 can be biased to an open position by a torsion spring that is mounted pivotally on the rivet shaft and connected between the cover plate 72 and the mounting plate 70. The torsion spring is an example of a ratchet biasing member, which biases the ratchet 24 towards the open position. The ratchet 24 moves between an unlatched position for releasing the mating latch component 96 and a latched position, such that the mating latch component 96 is received in the slot 114 and cooperates with the receiving slot 114 of the mounting plate 70. The ratchet 24 is biased to the unlatched position via a biasing member. The pawl 40 has can have a shoulder (or detent) that interacts or otherwise engages with primary and secondary shoulder stops of the ratchet 24, in order to releasably retain the ratchet 24 in the latched position. The pawl 40 can also feature a primary release tab 44 and/or a secondary release tab. Pawl 40 is mounted to mounting plate 70 about pivot point 41 and is normally biased towards a ratchet engaging position, illustratively counterclockwise in the Figures.

The pawl 40 is biased to a locking position (e.g. latched position) where the ratchet 24 is shown in a primary latched position by a torsion spring. The torsion spring 48 is an example of a pawl biasing member. Accordingly, the pawl 40 can be biased to engage with the ratchet 24 via the pawl biasing member.

A release lever 50 can also pivotally mounted between the mounting plate 70 and the cover plate 72. The primary release lever 50 can include a tab 52 for connection to a release cable 402 that is connected to a release handle 400 located in the vehicle 4 compartment for initiating by an occupant for opening of the latch 100. The end result of normal operation of the release lever 50 is that the pawl 40 is disengaged with the ratchet 24, under action of the pawl biasing member, thus allowing the ratchet biasing member to assist in pivoting the ratchet 24 from the closed (or latched position to the open or unlatched position (not shown)). The primary release lever 50 can interact with the pawl 40 via its primary release tab 44 and can thus also be biased by pawl biasing member into the non-engaged position.

Figure 3:
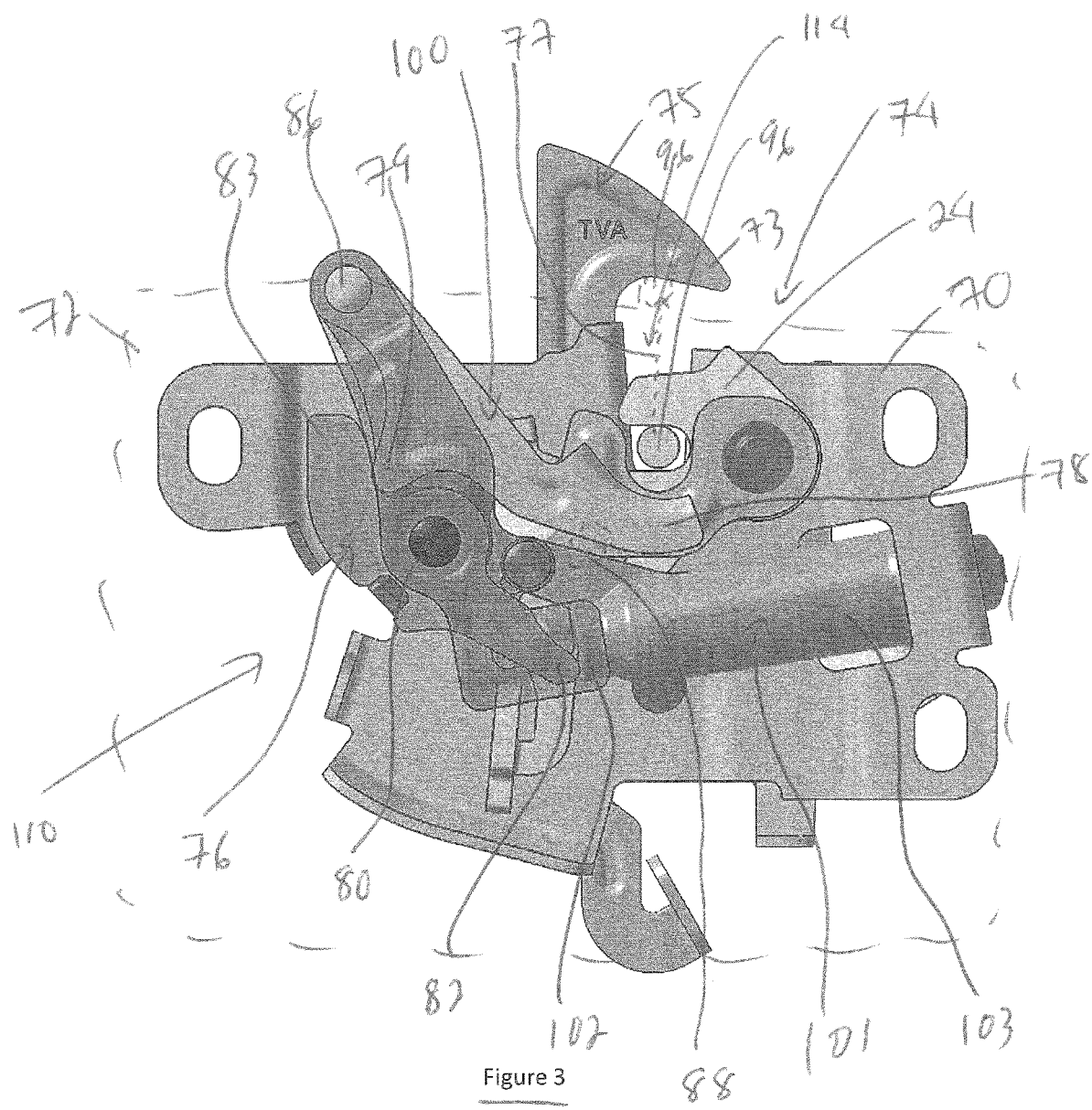
FIG. 3 is further embodiment of the latch of FIG. 1.
Figure 4:
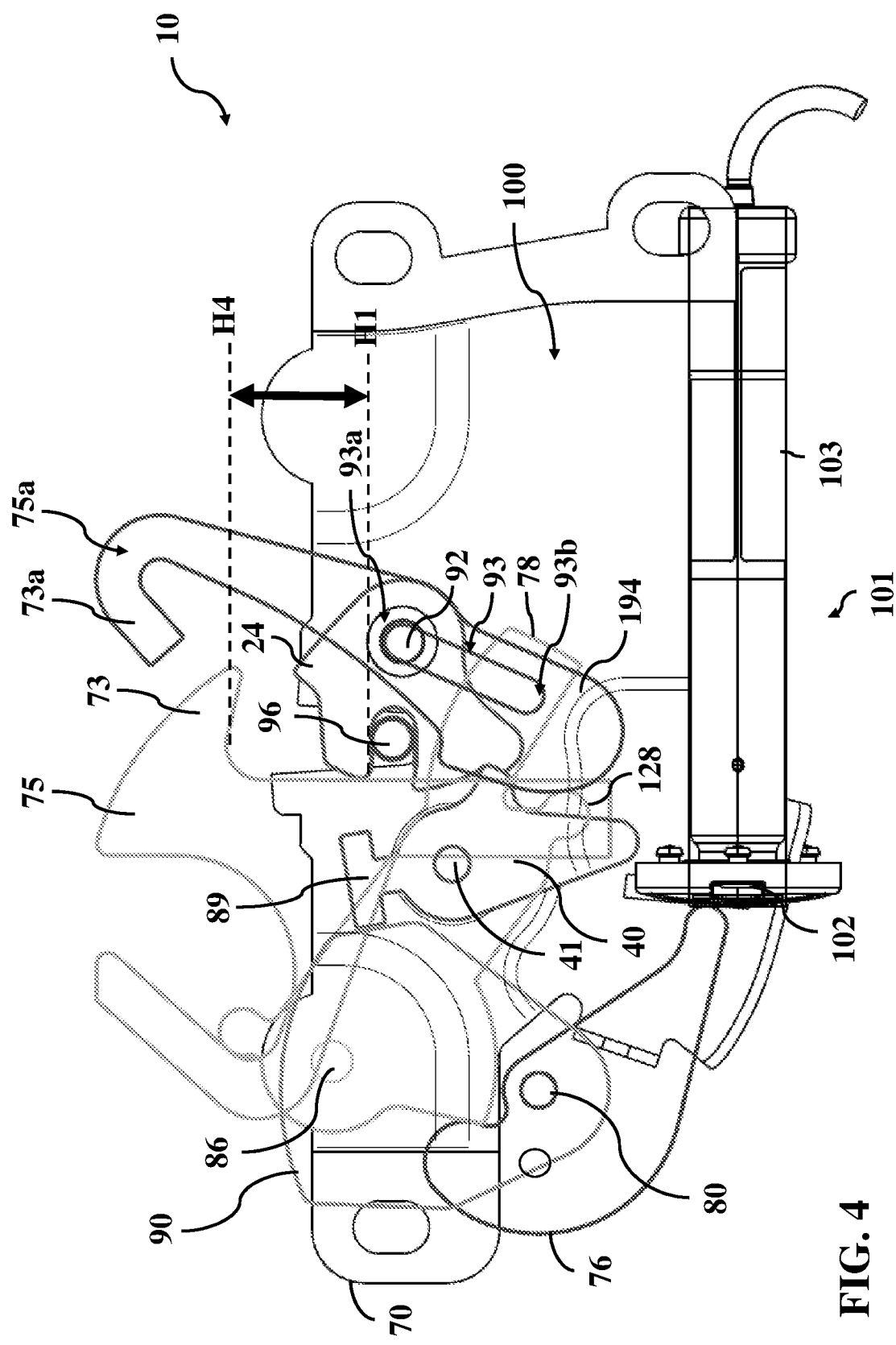
FIGS. 4-4A are still further embodiments of the latch of FIG. 3 including a pair of secondary catches.
Figure 4A:
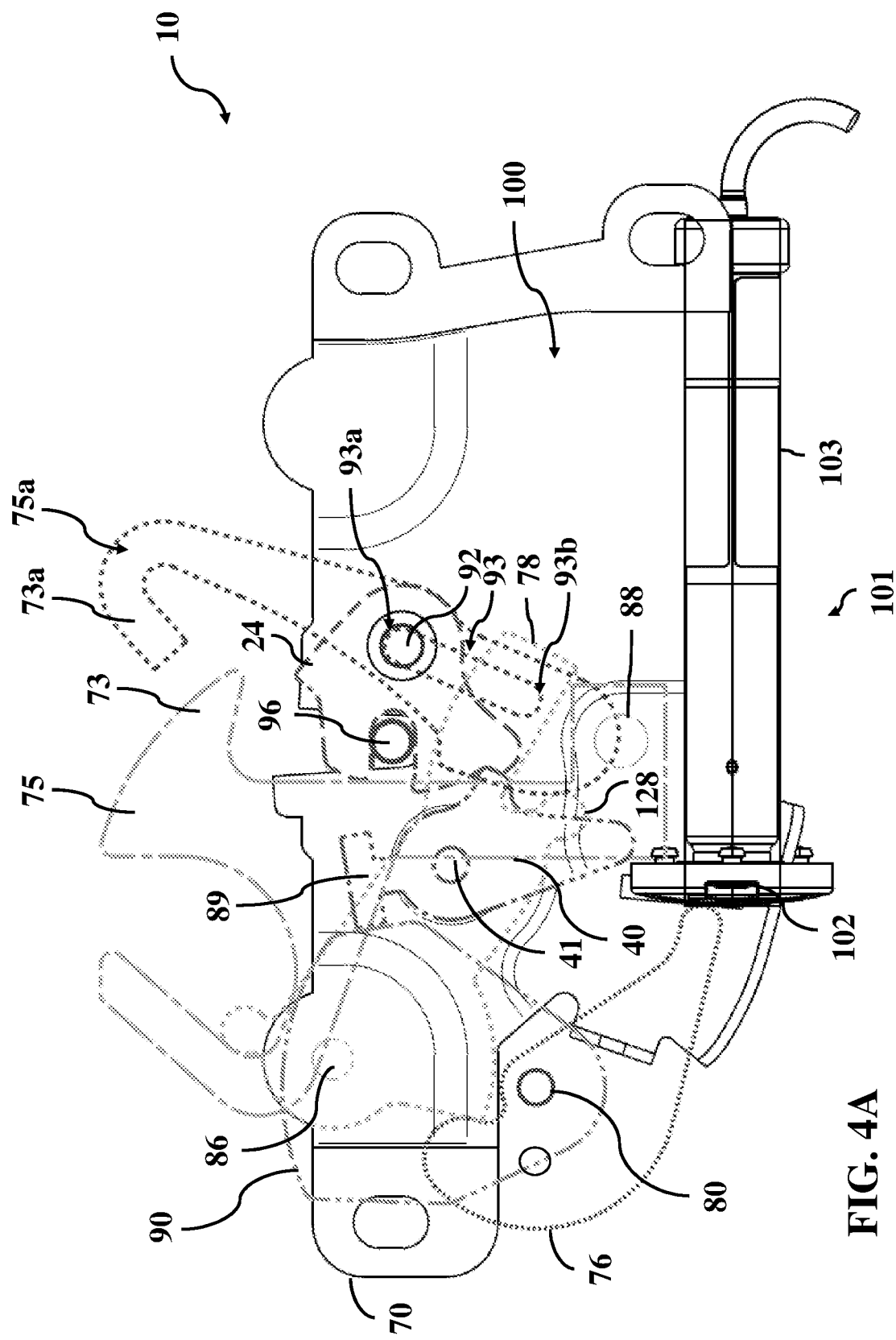

As noted above, however, the latch assembly 10 can be coupled to actuation system 101, shown in FIG. 1 and FIG. 3. The actuation system 101 can include a support plate that can connect to the mounting plate 70 of the latch 100 and thereby can form part of the housing 74, as desired.

Referring to FIG. 3, the latch 100 as shown can have an active pop-up height, e.g. min 30 mm pop-up height during active firing of the actuator system 101. The latch 100 can have additional latch elements 110 of a control lever 76 coupled to a lift lever 78. The control lever 76 is actuated by the actuation system 101 (e.g. by a piston 102 propelled by a cylinder 103—e.g. a pyrotechnic/chemical actuator). The control lever 76 can pivot about pivot 80 as a control tab 82 of the control lever 76 is forced (e.g. pushed) by the piston 102 upon actuation of the actuation system 101 (e.g. by firing of the cylinder 103). The control lever 76 also has a control arm 83 for forcing against the lift lever 78 (e.g. against lift lobe 79) in order to rotate the lift lever about pivot 86 and into contact with the mating latch component 96 (e.g. striker) in order to facilitate movement 77 of the out of the slot 114 and into contact with the secondary catch 75 (as shown in ghosted view). It is also recognized that once the mating latch component 96 is in contact and retained by the secondary catch 75, the latch 100 would be considered in the secondary latched position or secondary closed position. Further, when the mating latch component 96 is retained by the ratchet 24 in the slot 114, this can be referred to as the primary latched or primary closed position. The secondary catch 75 will limit the pop-up height of the hood 6 to a secondary catch height H4 (e.g. safety catch function) when the secondary catch 75 is aligned with the slot 114, and the ratchet 24 is positioned to release the mating latch component 96 during a non-active pedestrian, or normal unlatching opening operation (e.g. the actuator 103 is not fired) and inside release handle 400 is actuated.

Figure 5:
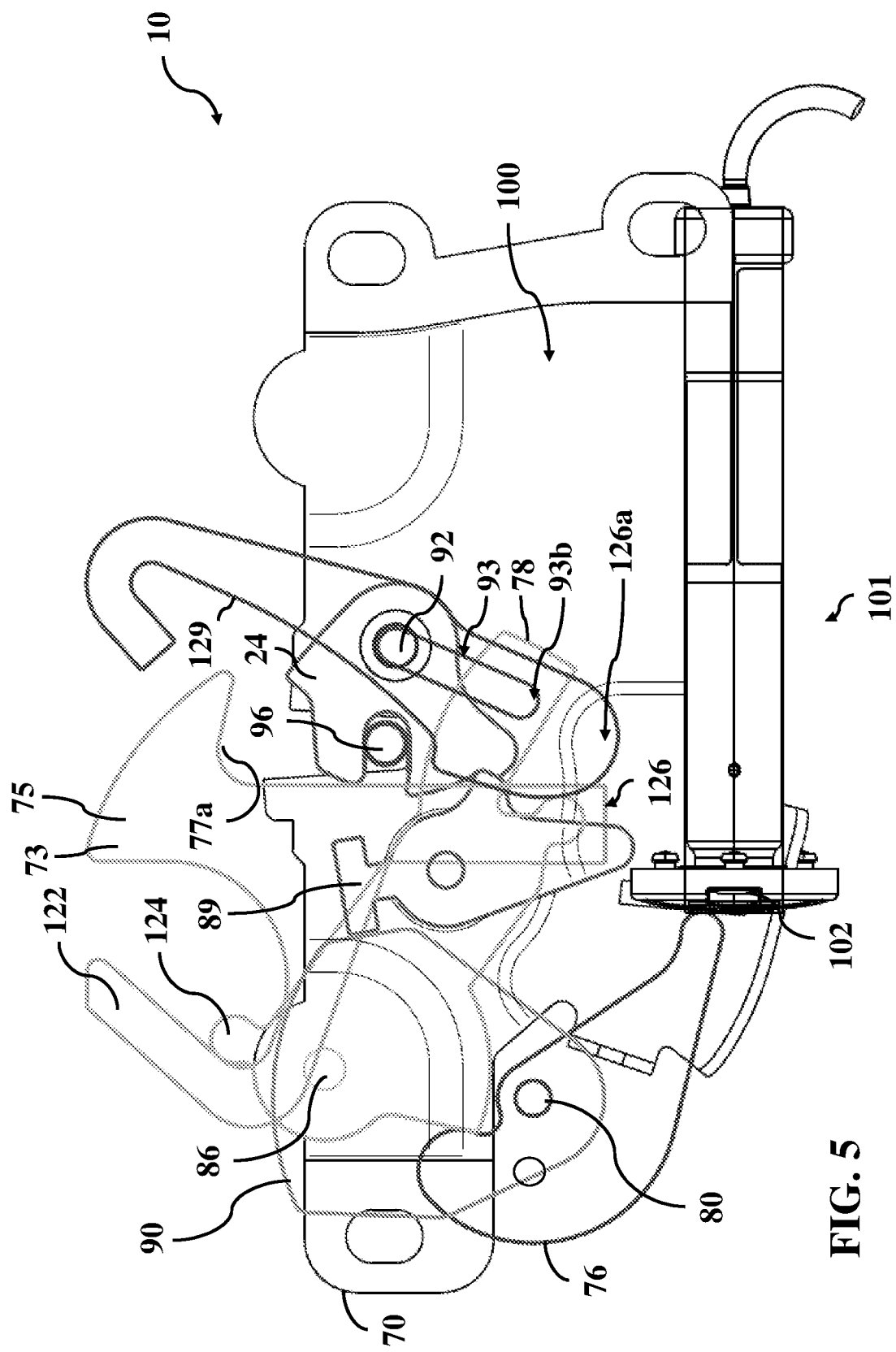
FIGS. 5, 5A, 6, 6A, 6B and 7 are operational examples of the latch of FIG. 4.
Figure 5A:
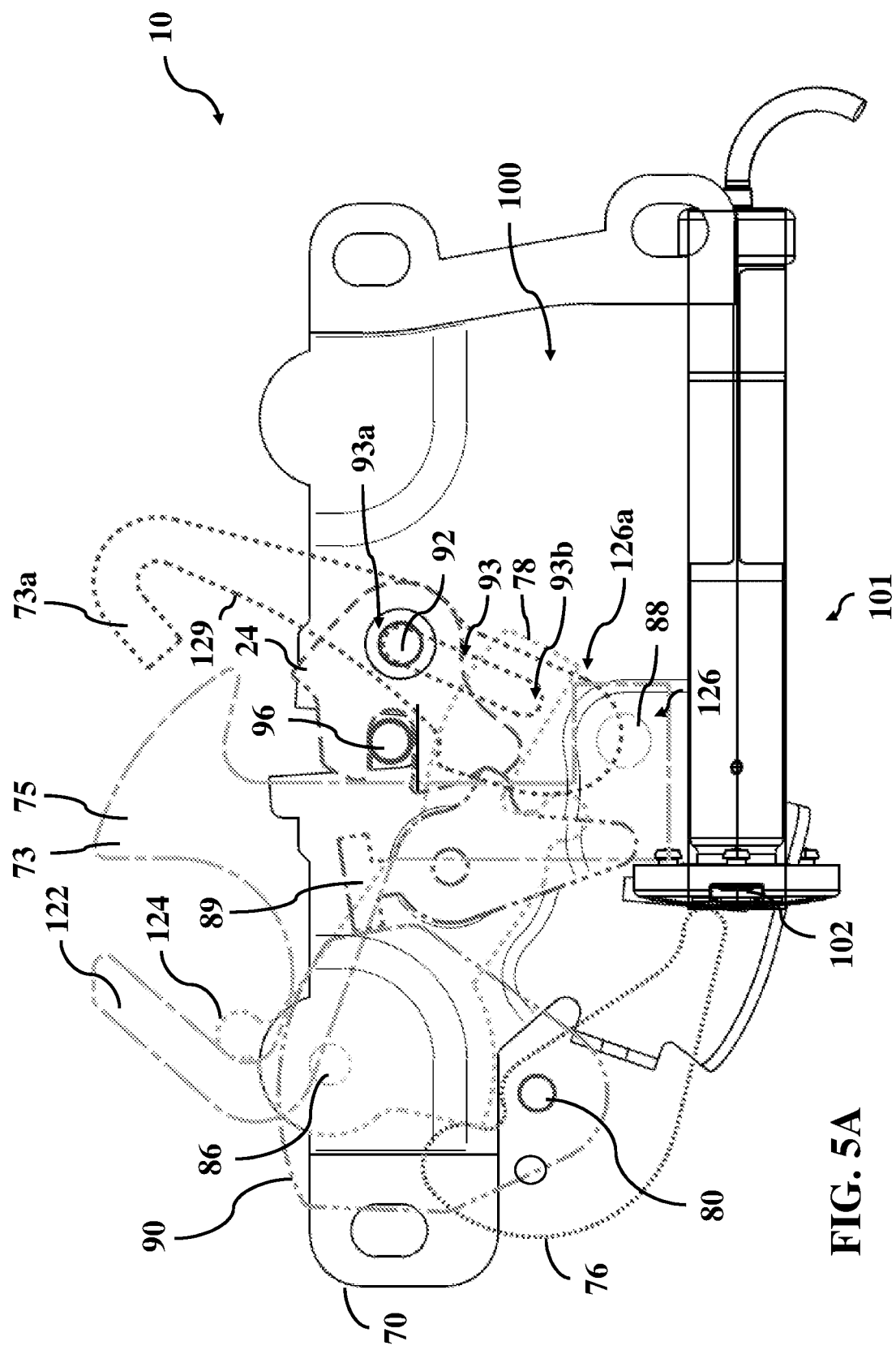

It is recognized that synchronous (or in combination) with actuation of the actuation system 101, the pawl 40 (see FIG. 2) can be released in order to unlock the ratchet 24 and thus allow the mating latch component 96 to be removed from between the arms of the ratchet 24 and begin travel out of the slot 114. For example, movement of the piston 102 against the pawl 40 can cause actuation of the pawl 40 and thus release of the ratchet 24. Alternatively, movement of the piston 102 against a pawl release tab 89 (see FIG. 5) can cause actuation of the pawl 40 and thus release of the ratchet 24. Alternatively, movement of the piston 102 against the control lever 76 can cause movement and thus contact between the control lever 76 and the pawl 40 in order to effect actuation of the pawl 40 and thus release of the ratchet 24. Alternatively, movement of the piston 102 against the control lever 76 can cause movement and thus contact between the lift lever 78 and the pawl 40 in order to effect actuation of the pawl 40 and thus release of the ratchet 24. Another alternative embodiment, as shown in FIG. 5, is where actuation of the control lever 76 causes a control member 90 to concurrently pivot (e.g. about pivot 80) into contact with the pawl release tab 89 and thus release/actuate the pawl 40 in order to release the ratchet 24 (to allow the mating latch component 96 to move out of the slot 114 from the primary closed position towards the secondary closed position). The control member 90 can be used optionally to couple movement of the control lever 76 with the pawl release tab 89. Illustratively shown is control lever 76 and control member 90 coupled together for co-rotation with one another e.g. rotation of one of the control lever 76 and control member 90 imparts a rotation of the other one of the control lever 76 and control member 90). As such, it is recognised that the pawl 40 (and subsequently the ratchet 24) is released before the lift lever 78 can facilitate travel of the mating latch component 96 out of the slot 114 and into the secondary closed position as defined by retention of the mating latch component 96 by the secondary catch 75 (e.g. by a hook portion 73).

Referring again to FIGS. 3 and 4, shown is an active secondary catch 75a that is supplemental (i.e. in addition to) the secondary catch 75. The secondary catch 75 has a pivot 88 (shown in ghosted view) in order to provide for the secondary catch 75 to be pivoted out of the way of the slot 114 and thus facilitate the mating latch component 96 to move out of contact with the hook portion 73 (e.g. as typically done manually by an occupant of the vehicle 4) and thus facilitate opening of the closure panel 6 (e.g. as typically done manually by an occupant of the vehicle 4) in order to move the mating latch component 96 from the secondary latched position to the fully open position (see FIG. 1). This operation would be done in relation to the operation of the latch 100 embodiment as shown in FIG. 3, having the secondary catch 75 without use of the active secondary catch 75a of FIG. 4. It is recognized that the position of the secondary catch 75 and the active secondary catch 75a in FIG. 4 can be referred to as their rest positions.

In terms of operation of the latch 100 embodiment of FIG. 4, there is provided an exchange in positioning (see FIGS. 5, 6, 7) between the secondary catch 75 and the active secondary catch 75a, once the actuation system 101 is deployed. As further described, the actuation of the control lever 76 by the actuation system 101 causes movement (e.g. pivoting) of the secondary catch 75 away from open top end 114a, thus removing any impediment to travel of the mating latch component 96 by the hook portion 73. In exchange, the active secondary catch 75a with associated hook portion 73a is moved (e.g. pivoted) into position of the open top end 114a of the slot 114 and thus ready to capture the mating latch component 96 in the secondary closed position (see FIG. 6). It is recognized that the position of the secondary catch 75 and the active secondary catch 75a in FIG. 6 can be referred to as their deployed positions.

Referring again to FIG. 4, the active secondary catch 75a can move (e.g. pivot) about connection (e.g. pivot) 92. The active secondary catch 75a can also have a slot (or track) 93 in a body 194 of the active secondary catch 75a, in which the connection 92 (e.g. pin) is positioned. The slot 93 has a first end 93a and a second end 93b, such that the connection 92 can travel in the slot 93 from the first end 93a (see FIG. 6) towards the second end 93b (see FIG. 7) as the mating latch component 96 travels out of the slot from the primary latched position to the secondary latched position. It is recognized that a length of the slot L (see FIG. 7) can be used to advantageously extend a distance E (e.g. from 30 mm to 60 mm) the secondary latched position of the mating latch component 96 between the secondary latched position shown in FIG. 3 (as defined by the secondary catch 75) to that shown in FIG. 7 (as defined by the active secondary catch 75a). It is recognized that the position of the active secondary catch 75a in FIG. 7 can be referred to as its travel position (i.e. in view of the pivot 92 travelling in the slot 93 between the ends 93a,b).

Referring to FIG. 5, the secondary catch 75 can have catch arm 122 coupled (via connection 124—e.g. pin) to the lift lever 78. Upon actuation of the lift lever 78 (e.g. through movement of the control lever 76), the connection 124 can be displaced along the catch arm 122 and thus force movement (e.g. pivoting) of the secondary catch 75 about the pivot 88 and thus move the hook portion 73 away from the mouth (e.g. open top end 114a) of the slot 114 (see FIG. 6).

It is recognized that movement of the active secondary catch 75a from the primary latched position (see FIG. 5) to the secondary latched position (see FIG. 6) can be accomplished in a number of ways, as desired. For example, a bottom end 126 of the secondary catch 75 can be coupled to a bottom end 126a of the active secondary catch 75a, thus causing pivoting of the active secondary catch 75a (and thus the hook portion 73a) about the pivot 92 in to the secondary latched position as the secondary catch 75 (and thus the hook portion 73) is pivoted away from the secondary latched position. Alternatively, or in addition to, an element 128 (e.g. pin) can be used to couple (e.g. acting on face 129) movement of the lift lever 78 with the active secondary catch 75a, thus providing for coupled movement between the lift lever 78 and the active secondary catch 75a as the active secondary catch 75a is moved from the primary latched position to the secondary patched position. It is recognized that the active secondary catch 75a is positioned away from the open top end 114a when in the primary latched position and is positioned over (and thus in the way of the mating latch component 96 in order to retain same in the hook portion 73a) the open top end 114a when in the secondary latched position.

Figure 6:
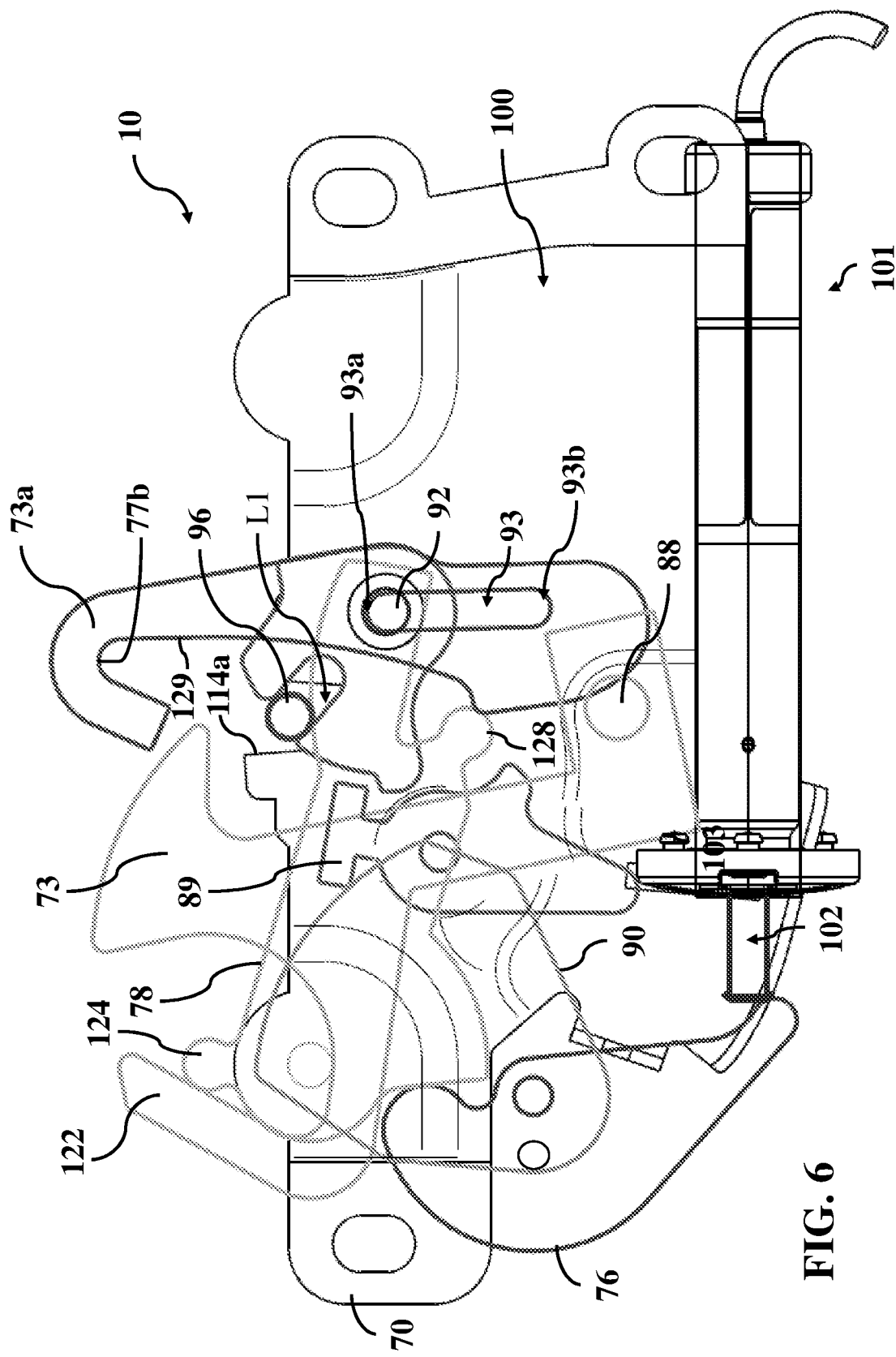
Figure 6A:
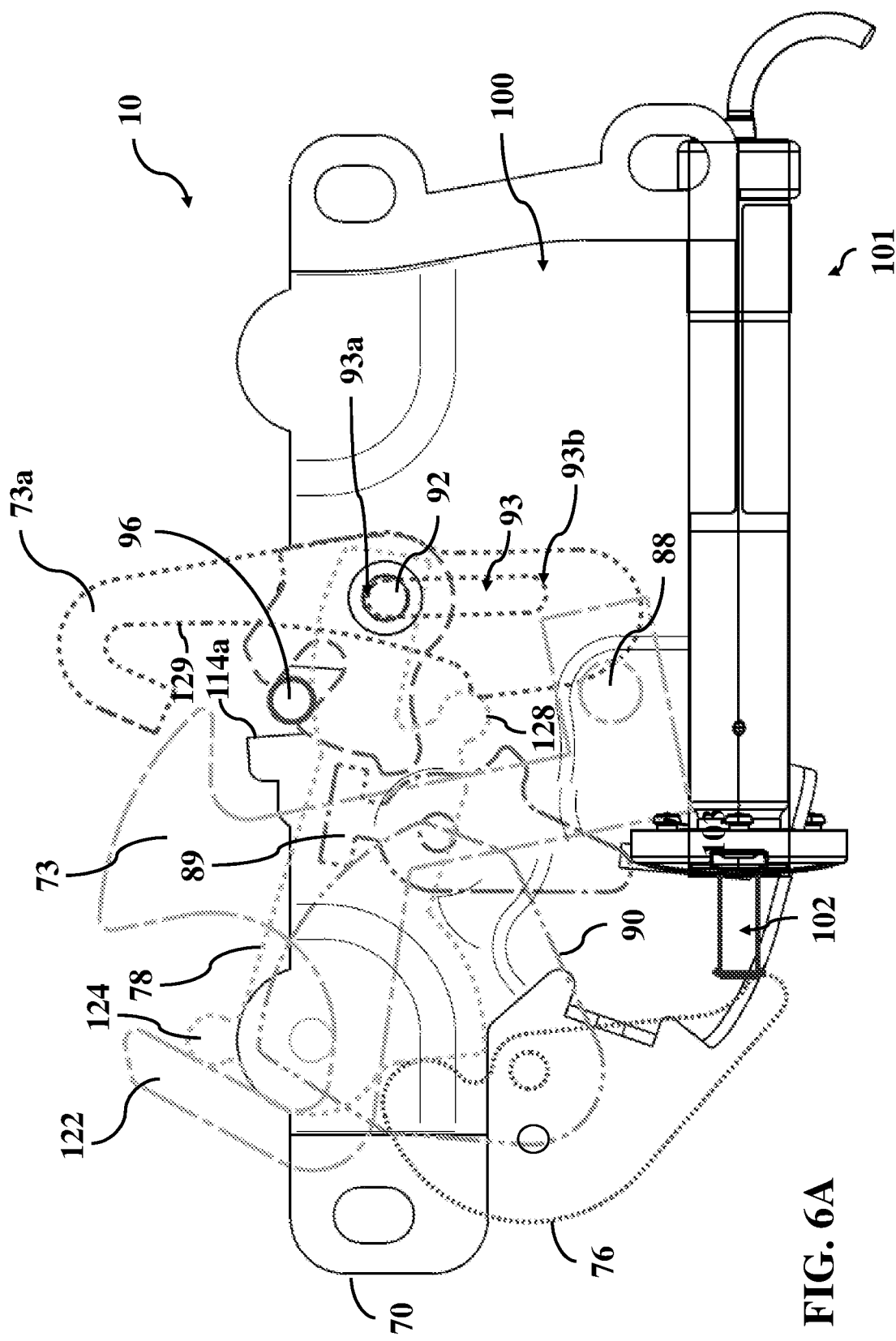
Figure 7:
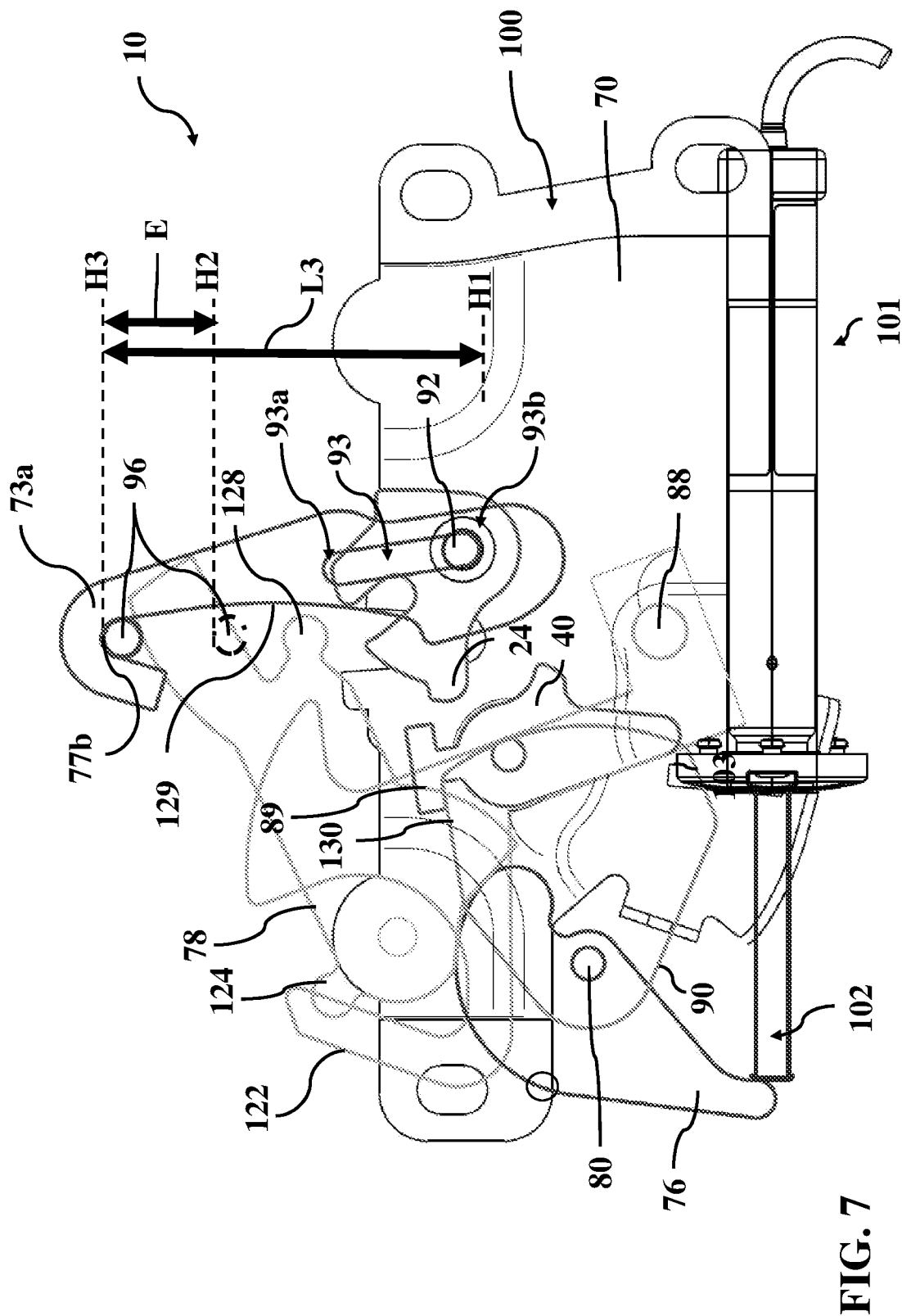

Referring to FIGS. 6 and 7, once the active secondary catch 75a is positioned over the open top end 114a, further travel of the mating latch component 96 via movement of the lift lever 78 can cause the pivot 92 to travel in the slot 93 from the second end 93b to the first end 93a, thus realizing the increased pop up height (e.g. extension E) of the closure panel 6 connected to the mating latch component 96. Referring to FIG. 5, the latch 100 is shown in the initial position (i.e. primary latched position). Referring to FIG. 6, the latch 100 is shown in an intermediate position (e.g. before the mating latch component 96 is retained by the hook portion 73a). Referring to FIG. 7, the latch 100 is shown in the full travel position (i.e. the secondary latched position), after the pin 92 traveled (e.g. slid) along the slot 93 from the second end 93b to the first end 93a.

Referring again to FIG. 7, further optionally, the control element 90 can have a lock tab 130 e.g. locking surface, for use in locking the control element 90 in the secondary latched position (e.g. by engagement with pawl release tab 89), thereby maintaining control lever 76 and coupled lift lever 78 in the fully actuated position as shown in FIG. 7. For example, deactivation of the actuation mechanism 101 (e.g. release of gas/air from the cylinder 103) can cause the control lever 76 to pivot about pin 80 and return to the position shown in FIG. 4. Similarly, the control element 90 also returns to the position shown in FIG. 4 and thus can release the pawl release tab 89 from the position shown in FIG. 4, thus providing for the unlocking and thus return of the lift lever 78 to the position shown in FIG. 4. Once the lift lever 78 is facilitated to return to the position shown in FIG. 4, the mating latch component 96 can travel (e.g. under gravity and/or manual effort of the occupant of the vehicle 4) away from the secondary latched position (see FIG. 7) and towards the open top end 114a of the slot 114 and thus into the slot 114 and return to the ratchet 24 (e.g. for subsequent retention by the ratchet 24 as desired). As such, the latch assembly 10 can be operated from the primary latched position (see FIG. 4) to the secondary latched position (see FIG. 7) and returned to the primary latched position (see FIG. 4), as facilitated by operation of the control lever 76 and coupled lift lever 78 under direction of the actuation system 101.

It is recognized that any or all of the control lever 76, the control member 90, the lift lever 78, and/or the secondary catch 75 can be biased towards their primary latched position (see FIG. 4) by one or more resilient elements (e.g. springs)—not shown, as desired.

After latch firing (e.g. deployment of the pyrotechnic actuator—cylinder 102) the deactivation (return to secondary position) can be done by pulling an inside release handle of the release lever 50 (see FIG. 2). The latch 100 of FIGS. 3,4 can be a modular latch assembly 10. Further, it is recognized that the closure panel 6 can be held in the deployed position (e.g. in the secondary latched position under influence of the actuation system 101 via deployment of the active secondary catch 75a) by actuator residue pressure of the cylinder 102. After latch firing, the deactivation (return to secondary position) can be done by pulling an inside release handle to release the release lever 50 and thus unlock the pawl release tab 89 from lock tab 130 in the position shown in FIG. 7, to allow lift lever 78 to rotate clockwise under the weight of the hood 6 (e.g. lift lever 78 is able to rotate control lever 76 which is prevented from rotating when control member 90 is blocked by pawl release tab 89 engaged with lock tab 130). It is noted that features of the described latch assembly 10 can include increased packaging in vertical direction and/or the active secondary catch 75a (and/or the secondary catch 75) can be attached to the latch 100 or to the vehicle body 5 in order to interact with the mating latch component 96 (e.g. striker). Accordingly, the latch assembly 10 can uses a control member 90 and control lever 76 (e.g. a camming chain), but can have the addition of the active secondary catch 75a which swings from a rest position to a deployed position in order to catch the mating latch component 96 at its top position (e.g. secondary latched position). This configuration provides the active secondary catch 75a that is deployed only when the actuation mechanism 101 is fired so the active secondary catch 75a is not in the way during day to day closure panel 6 opening (e.g. in non-emergency/collision situations). Active secondary catch 75a when deployed acts in a manner similar to secondary catch 75 in order to catch, or restrict, the upwardly moving striker, or mating latch component 96 whose motion is imparted by the lifting action of the lift lever 78. However, secondary catch 75a includes a catch surface 77b having a distance when in its travel position greater away from the closed bottom end 114b than the catch surface 77a of the secondary catch 75, thus allowing the striker (mating latch component 96) to move away from the closed bottom end 114b a greater distance and providing a greater movement of the hood 6 for increasing active pedestrian protection (e.g. moving the hood 6 away from the hard surfaces of the engine block etc.). Also, secondary catch 75a includes a catch surface 77b having a distance when in its deployed position greater away from the closed bottom end 114b than the catch surface 77a of the secondary catch 75.

Reference is made to the above figures, which show the different versions of the actuation system 101. The device of the actuation system 101 can include a fluid-actuated cylinder 103, a control valve and a source of pressurized fluid (not shown). The cylinder 103 can includes a cylinder housing and a piston 102 that is movable in the cylinder housing between an unactuated position (see FIG. 4) and an actuated position (see FIG. 7). A piston biasing member (not shown) can be provided and can bias the piston 102 towards the unactuated position, so as to keep the piston 102 in the unactuated position when the vehicle 4 is not incurring a collision event. In the unactuated position, the control valve prevents fluid flow to the cylinder 103 thereby preventing actuation of the cylinder 103. In the open position the control valve permits fluid flow from the source of pressurized fluid to the cylinder 103 to drive the piston 102 to the actuated position. The source of pressurized fluid may simply be a vessel containing any suitable fluid, such as, for example, compressed Carbon Dioxide at a suitable pressure, such as, for example 2000 psi. In this embodiment, the control valve can be referred to as a release member that is controllable to expose the piston 102 to the pressurized fluid. In another embodiment, the source of pressurized fluid may be an inflation device that is similar to an airbag inflation device, and that includes an igniter and two combustible chemicals, such as Sodium Azide and Potassium Nitrate, which, when ignited by the igniter, generate Nitrogen at high pressure which can be used to drive the piston to the actuated position. In such an embodiment, a control valve would not be needed. However, a controller controls the operation of the igniter. In such an embodiment, the igniter may be referred to as a release member that is controllable to expose the piston 102 to the pressurized fluid.

Figure 8:
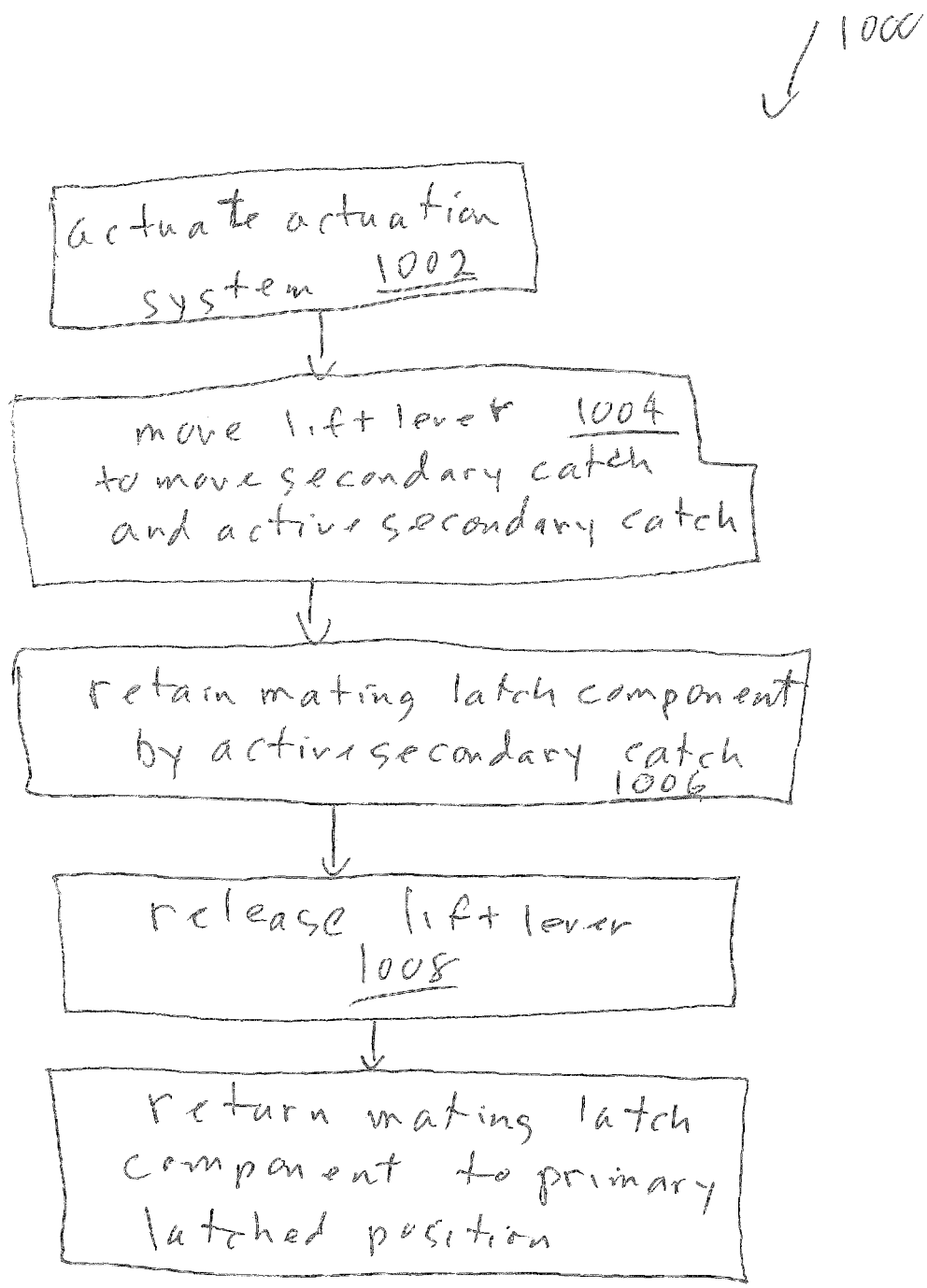
FIG. 8 is a method of operating the latch of FIG. 4.

Referring to FIG. 8, shown is a method 1000 for operating the latch assembly 10 of FIG. 4. At step 1002, the actuation system 101 is actuated in order to release the ratchet 24 and thus move the mating latch component 96 out of the primary latched position. At step 1004, once the ratchet 24 is released, the lift lever 78 is moved (as the actuation system 101 actuates) in order to move the secondary catch 75 away from the slot 114 and the active secondary catch 75a towards the slot. At step 1006, the mating latch component 96 is retained by the active secondary catch 75a as the active secondary catch 75a moves from the deployed position to the travel position under influence of further movement of the lift lever 78 from the secondary latched position to the travel position (e.g. via movement of the mating latch component 96 driven by the lift lever 78). At step 1008, the lift lever 78 is released (e.g. via release of the pawl release tab 89). At step 1010, the mating latch component 96 returns from the travel position to the primary latched position as the lift lever 78 is returned to the primary latched position. Further, the secondary catch 75 and the active secondary catch 75a are returned to their rest positions. It is recognized that movement of the secondary catch 75 away from the slot 114 causes the hook portion 73 to become unaligned with the slot 114, thereby inhibiting retention of the mating latch component 96 by the secondary catch 75. Further, the deployment of the active secondary catch 75a towards the slot 114 causes the hook portion 73a to become aligned with the slot 114, thereby effecting the retention of the mating latch component 96 by the active secondary catch 75a.

Figure 6B:
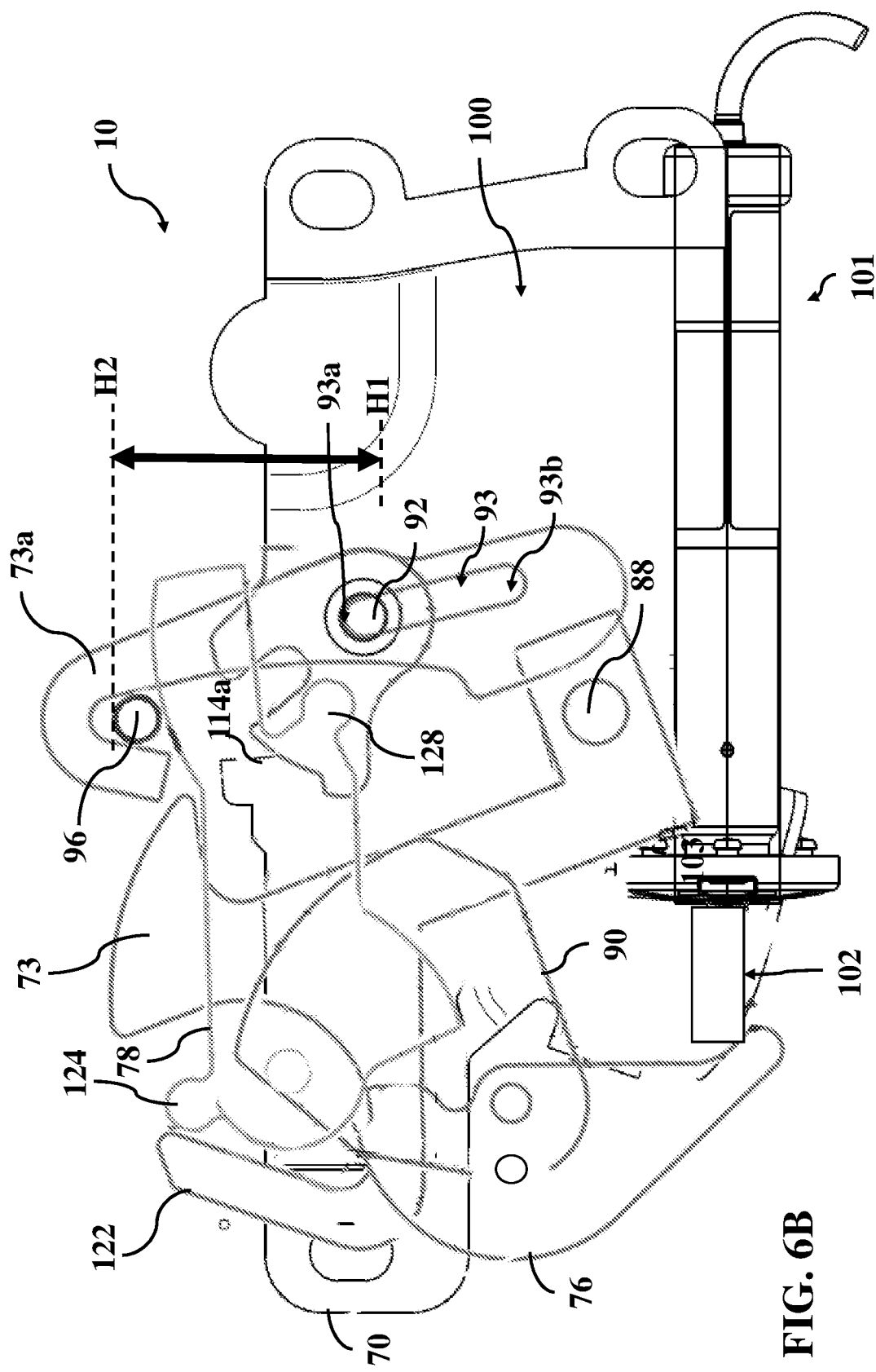

Now referring to FIG. 9A to 9C, in operation, FIG. 9A shows the mating latch component 96 at an initial height H1 and engaged with the ratchet 24, the ratchet 24 being held by the pawl 40 in the primary latched position. Secondary catch 75 is aligned with slot 114 and disengaged from mating latch component 96. Active secondary catch 75a is not aligned with slot 114 and disengaged from mating latch component 96. Upon detection of an active pedestrian event (e.g. an imminent collision or detected collision of the vehicle 4 with a pedestrian), an active pedestrian control system 121, or the vehicle Body Control Module, being in electrical communication with actuation mechanism 101, commands actuation mechanism 101 to fire to deploy the piston 102. As shown in FIG. 9B, the ratchet 24 is released by the pawl 40 to release the mating latch component 96 to allow the mating latch component 96 to be moved away from its initial height H1 under influence of the lift lever 78 in a manner as described hereinabove. Active secondary catch 75a is moved into alignment with slot 114 and into its intermediate position aligned with slot 114 but not extended to its travel position. Continued movement of piston 102 results in mating latch component 96 moved into engagement with active secondary catch 75a at first active pop-up height H2, e.g. min 30 mm, as shown in FIG. 6B. As shown in FIG. 9C, continued deployed of piston 102 results in the ratchet 24 remaining released by the pawl 40 to release the mating latch component 96 to allow the mating latch component 96 to be moved away from the first active pop-up height H2 under influence of the lift lever 78 in a manner as described hereinabove. Active secondary catch 75a remains in alignment with slot 114 and is moved from its intermediate position to its travel position to a second pop up height H3 (e.g. 60 mm min) as a result of contact between mating latch component 96 and catch surface 77b. Upon connection (e.g. pivot) 92 reaching the second end 93b, catch surface 77b will prevent mating latch component's further 96 upward movement.

Now referring to FIG. 10, in a reset operation of the latch 100 into a non-deployed position e.g. mating latch component 96 returned to the primary latched position or lift lever 78 is allowed to move downwardly to allow mating latch component 96 to move towards closed bottom end 114b, inside handle 400 is actuated I to move II pawl 40 (e.g. clockwise) to thereby disengage pawl release tab 89 from lock tab 130 and allow control member 90 and control lever 76 to co-rotate V under the force imparted IV by lift lever 78 acting on control lever 76 due to the force III of mating latch component 96 pushing downwardly on lift lever 78 under the weight of the panel 6. Rotation of control lever 76 forces VI piston 102 to move from its deployed position to its retracted position. Active secondary catch 75a is moved VII from its intermediate and travel position to its non-aligned position, while secondary latch 75 moves VIII into alignment with slot 114 as shown in FIG. 4. Release of inside release handle 400 allows pawl 40 to return into a ratchet holding position under influence of pawl bias (illustratively biasing pawl 40 in the counterclockwise direction) to permit ratchet 24 to hold mating latch component 96 in the primary latch position upon mating latch component 96 being received by ratchet 24.

We claim:

1. A latch assembly (10) for a closure panel (6) of a vehicle (4), the latch assembly comprising:
    a mounting plate (70);
    a ratchet (24) and pawl (40) pivotally mounted to the mounting plate, the ratchet for retaining a mating latch component (96) in a primary latched position in a slot (114) of the mounting plate, the ratchet released from the primary latched position by movement of the pawl;
    a secondary catch (75) coupled to the mounting plate for retaining the mating latch component in a secondary latched position after the mating latch component being released from the ratchet;
    an active secondary catch (75a) coupled to the mounting plate by a pivot connection (92), the active secondary catch for retaining the mating latch component in a travel position after said mating latch component being released from the ratchet, the travel position being further from the slot than the secondary latched position, the active secondary catch having a slot (93) providing for translation of the pivot connection therein;
    a lift lever (78) mounted to the mounting plate, the lift lever for moving the mating latch component past the secondary latched position to the travel position as the pivot connection travels along the slot;
    wherein actuation of the lift lever by an actuation system (101) causes movement of the secondary catch away from the slot in order to inhibit retention of the mating latch component thereby and to deploy the active secondary catch towards the slot in a deployed position in order to facilitate retention of the mating latch component thereby.

2. The latch assembly of claim 1 further comprising the actuation system coupled to a control lever (76), the control lever coupled to the lift lever, whereby actuation of the lift lever by the actuation system causes said deploy of the active secondary catch.

3. The latch assembly of claim 2, wherein the actuation system is mounted on the mounting plate and includes a cylinder (103) for actuating a piston (102), the piston coupled to the control lever.

4. The latch assembly of claim 2 further comprising a control member (90) coupled to the control lever, the control member configured for concurrent movement with the control lever in order to effect said movement of the pawl.

5. The latch assembly of claim 1, wherein the secondary catch has a hook portion (73) for retaining the mating latch component in the secondary latched position and the active secondary catch has a further hook portion (73a) for retaining the mating latch component in the travel position.

6. The latch assembly of claim 1, wherein the deployed position of the active secondary catch is when the pivot connection is in the slot towards a second end (93b) of the slot and the travel position is when the pivot connection is in the slot towards a first end (93a) of the slot, the first end opposed to the second end.

7. The latch assembly of claim 5, wherein said movement of the secondary catch away from the slot causes the hook portion to become unaligned with the slot, thereby effecting said inhibit retention of the mating latch component.

8. The latch assembly of claim 5, wherein said deploy the active secondary catch towards the slot causes the further hook portion to become aligned with the slot, thereby effecting said retention of the mating latch component.

9. The latch assembly of claim 1, wherein the travel position is a secondary latched position of the active secondary catch.

10. The latch assembly of claim 4, wherein said movement of the pawl is a result of actuating a pawl release tab (89) by the control member, the pawl release tab for retaining the pawl in the primary latched position.

11. The latch assembly of claim 1 further comprising the secondary catch coupled at one end (126) to the active secondary catch at an end (126a), such that said movement of the secondary catch away from the slot causes said deploy the active secondary catch towards the slot via contact between the one end and the end.

12. The latch assembly of claim 1 further comprising an element (128) coupled between the lift lever and the active secondary catch, such that the element is moved by the lift lever in order to effect said deploy the active secondary catch towards the slot.

13. The latch assembly of claim 1 further comprising the secondary catch having a catch arm (122) coupled to the lift lever, such that actuation of the lift lever causes said movement of the secondary catch away from the slot.

14. The latch assembly of claim 13, wherein said coupled is a pin (124) moveable between the lift lever and the catch arm.

15. A method for operating a latch assembly having a ratchet for retaining a mating latch component in a primary latched position in a slot of the latch assembly, the latch assembly further having an actuation system for casing movement of a lift lever, the method comprising the steps of:
actuating the actuation system in order to release the ratchet and thus move the mating latch component out of the primary latched position;
moving the lift lever in order to move a secondary catch of the latch assembly away from the slot and to move an active secondary catch of the latch assembly towards the slot to a deployed position;
retaining the mating latch component by the active secondary catch as the active secondary catch moves from the deployed position to a travel position under influence of further movement of the lift lever, the travel position being further from the slot than the deployed position;
wherein said moving of the lift lever causes movement of the secondary catch away from the slot in order to inhibit retention of the mating latch component thereby and to deploy the active secondary catch towards the slot in the deployed position in order to facilitate retention of the mating latch component thereby.

16. The method of claim 15 further comprising the actuation system coupled to a control lever, the control lever coupled to the lift lever, whereby said moving of the lift lever by the actuation system causes said move of the active secondary catch.

17. The method of claim 16, wherein the actuation system is mounted on a mounting plate of the latch assembly and includes a cylinder for actuating a piston, the piston coupled to the control lever.

18. The method of claim 16 further comprising a control member coupled to the control lever, the control member configured for concurrent movement with the control lever in order to release a pawl retaining the ratchet in the primary latched position.

19. The method of claim 15, wherein the travel position is a secondary latched position of the active secondary catch.

20. The method of claim 18, wherein said release of the pawl is a result of actuating a pawl release tab by the control member, the pawl release tab for retaining the pawl in the primary latched position.

* * * * *